Dec. 8, 1942.  R. W. PITMAN  2,304,277
TYPEWRITING MACHINE
Filed Oct. 18, 1940  4 Sheets-Sheet 1

INVENTOR
RICHARD W. PITMAN
BY
R. G. Julihn
ATTORNEY

Dec. 8, 1942.    R. W. PITMAN    2,304,277
TYPEWRITING MACHINE
Filed Oct. 18, 1940    4 Sheets-Sheet 2

INVENTOR
RICHARD W. PITMAN
BY
*C. G. Julihn*
ATTORNEY

Patented Dec. 8, 1942

2,304,277

UNITED STATES PATENT OFFICE 2,304,277

TYPEWRITING MACHINE

Richard W. Pitman, West Hartford, Conn., assignor to Underwood Elliott Fisher Company, New York, N. Y., a corporation of Delaware Application October 18, 1940, Serial No. 361,673

16 Claims. (Cl. 197—127)

This invention deals with work-sheet-positioning devices in a typing machine, accounting machine or the like.

A work sheet may be removed from the machine after the latter has been operated to record an entry thereon; subsequently the work sheet is to be accurately replaceable in the machine in an advanced position in order to record a further entry. In this way, numerous entries are progressively recorded on the work sheet from time to time and are disposed at line-spaced intervals on the work sheet.

At each entry, the sheet is marked by suitable means in the machine with an index settable to a gaging device for relocating the sheet in an advanced position.

The machine may have a laterally movable carriage in order to extend the recorded line on the work sheet. A line-spacing mechanism is also provided and is usually operable coincidentally with returning the carriage.

The machine may also have means, operative in recording a new entry, to sense a record represented by perforations included in the preceding entry. It is necessary therefore to accurately relocate the sheet in its advanced position for each new entry so that the perforated record will be in accurate registry with the sensing means.

The general object of the invention is to provide a device for gaging the replacement of a work sheet in the machine and to adapt such device so that it serves accurately to locate the sheet, is simple in structure, and durable and conduces to time-and-labor-saving in the operations of removing and replacing the work sheet.

In order that the operation of the line spacing mechanism may not cause the sheet to become jammed and damaged by the gaging devices, it is a further object of the invention to provide means whereby the operation of the line spacer will automatically prevent interference of the gaging device with line space movement of the work sheet.

A further object is to provide an element which may be manipulated at will, independently of a line-spacing operation, to prevent obstruction by the gaging device of a shift of the work sheet.

Another object is to adapt the gaging device so that a simple and readily executed manner of manipulating the sheet itself will serve to engage the sheet with and disengage it from said gaging devices.

The machine herein shown has a revoluble platen or feed roller for the work sheet. It is a further object of the invention to provide means affording a passage for directing front-insertion of the work sheet to the platen or feed roller and to have said passage means conditionable for facilitating rear insertion of the work sheet.

It is a further object to adapt the gaging devices so that it suffices to present only one side or margin of the sheet thereto as distinguished from gaging the sheet at both sides or margins.

The machine has printing or recording mechanism which may operate automatically under the control of the work sheet perforations and sensing means for recording at least a part of each new entry on the work sheet. A further object of the invention is to provide a device responsive to the absence of a work sheet in the machine for suppressing such effectivity of the sensing means.

The foregoing and other objects, features and advantages of the invention will be apparent from the following description of a preferred embodiment.

A main frame F, partly shown, of a typewriter mounts front and rear tracks 15, 16 for the paper carriage 17. Type bars 18 are swingable toward a common type-guide 19 on a type-bar fulcruming segment 20. The type bars print on a work sheet 21 backed by a revoluble platen 22 whose axle 23 is journaled in left and right side members or plates 24 of a frame which may be case shiftable relatively to and mounted in a main frame 26 of the carriage.

A feed rack 27 on carriage frame 26 engages a pinion 28 having an escapement wheel 29 controlled by escapement dogs 30 that cooperate with type bars 18 through a universal bar 31 to letter feed the carriage. The usual spring motor 32 drives the carriage in letter feeding direction.

A rack 33 on carriage frame 26 meshes with a carriage-return pinion 34 movable along a power shaft 35 journaled on the main frame F and driven by an electric motor, not shown. A shifter 36 is operable either under control of a manually operable carriage return key, not shown, or automatically under control of means, not shown, actuated by the carriage at a line-end to move pinion 34 toward the rear of the machine into clutching engagement with a clutch collar 37 fixed to shaft 35. The resulting rotation of pinion 34 at first moves rack 33 endwise a limited extent in carriage-return direction relatively to the carriage; then the carriage is moved in return direction by the continued pinion-driven rack movement.

Figures 1, 2, 3, 4:
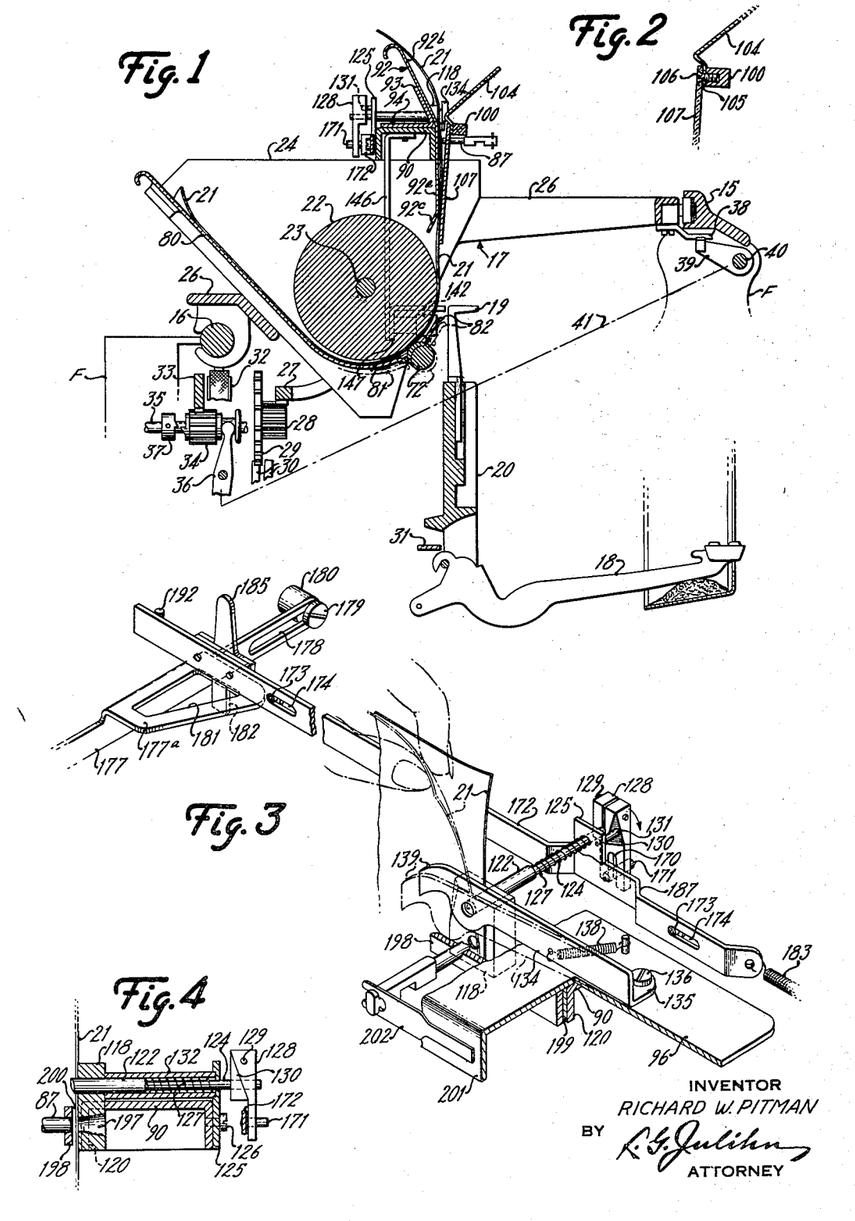
Figure 1 is a cross sectional side view of the carriage mechanism including the sheet insertion and locating structure.
Figure 2 is an enlarged scale cross sectional view of a detail of the sheet insertion structure.
Figure 3 is a perspective of the sheet locating pin structure and means for controlling projection and retraction of the pin.
Figure 4 is a large scale cross-sectional view, taken on the trace 4—4 of Figure 10, of mounting and operating means for the sheet locating pin.

The power-driven carriage return movement is terminated by encounter of a tappet 38 on carriage frame 26 with a cam arm 39 on a rock shaft 40 to rock the latter counterclockwise of Figure 1 to operate shifter 36 to unclutch pinion 34 from collar 37. For this purpose, rock shaft 40, which is journaled in frame F, has an operative connection, diagrammatically represented by the dot-and-dash line 41, Figure 1, to shifter 36. Cam-arm 39 may be splined to rock shaft 40 for adjustment along the latter to different line-start stations and may be associated with a laterally adjustable line-start margin stop, not shown.

As will appear later, rack 33 returns leftwardly endwise to its original position relatively to the carriage, when pinion 34 becomes unclutched from power shaft 35. Tongues 44 attached to carriage frame 26 slidably fit slots 45 in rack 33 to support the latter, and the ends of said slots engage said tongues to limit the described endwise movements of the rack relatively to the carriage.

Rack 33 includes line-spacer rack teeth 47, Figures 10, 13, 14, 15. A vertical rock shaft 48 is journaled in structure 49 fixed to the main carriage frame 26. A pinion 50 mounted on said structure 49 connects rack teeth 47 to a gear sector 51 fixed to the lower end of shaft 48. A pinion 52 fixed to the upper end of said shaft 48 meshes with a rack 53 slidably supported by said structure 49. The left side plate 24 of the case shiftable frame is adapted to support slidably a bar 54 to which is pivoted a line spacer pawl 55 normally disengaged from but engageable with a line-space ratchet wheel 56 attached to platen axle 23. A lateral tab 57 of bar 54 is engageable by a spur 58 of rack 53.

Figures 13, 14, 15:
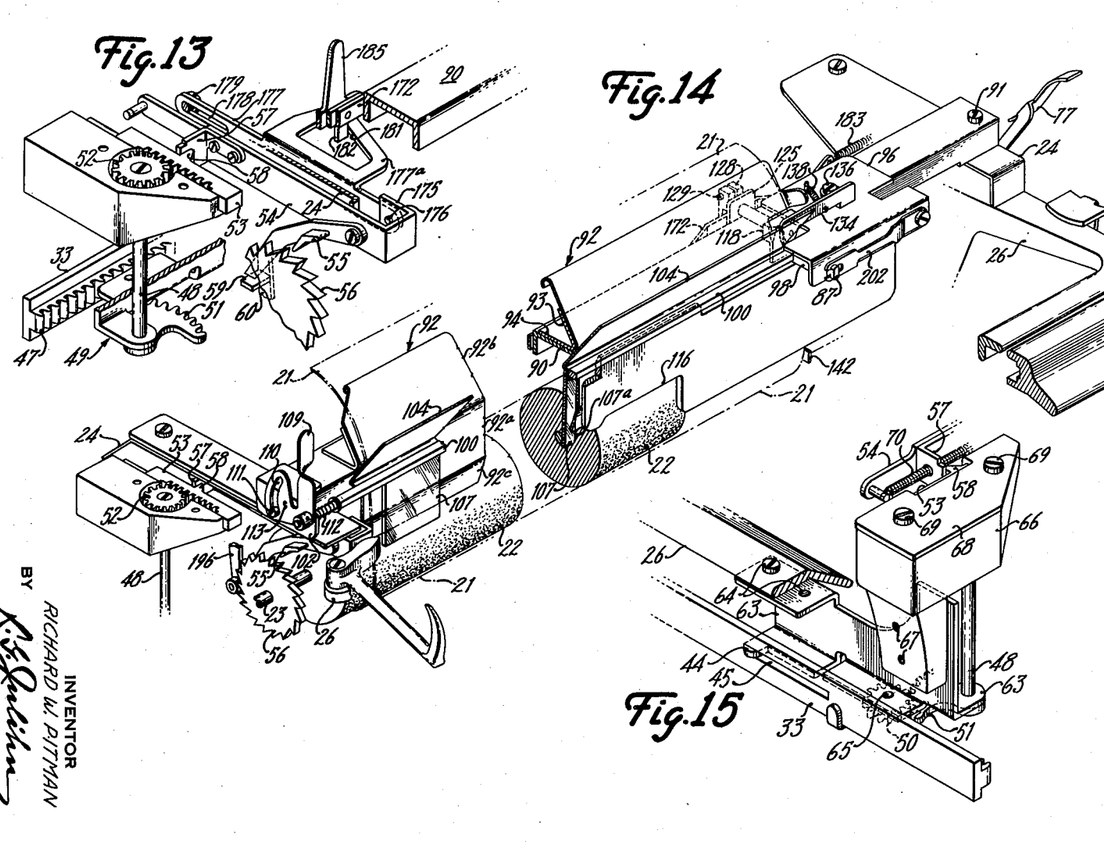
Figure 13 is a perspective of carriage-return and line-space mechanism and connections therefrom for controlling the sheet-locating pin.
Figure 14 is a perspective of the general assembly of sheet locating structure, line space mechanism, and other parts of the carriage.
Figure 15 is a perspective, from the rear of the carriage, illustrating details of the line space and carriage return structure.

The rightward movement of carriage return rack 33 relatively to the carriage frame 26 is translated by the parts 47, 48, 50—53 into a rearward stroke of the line-space-pawl carrying bar 54. At a suitable time in said stroke, depending on the number of line-space steps desired, pawl 55 becomes engaged with ratchet wheel 56 to rotate the latter and the platen in line space direction. A tab 59, Figure 13, is variably positionable by means of a manually settable adjuster 60, partly shown, to control the pawl 55 and hence its time of engagement with the ratchet wheel 56 so as to determine one, two, or three steps of line-space rotation of the platen by said rearward stroke of bar 54. Bar 54 may be case shiftable with the platen but in either case position, its tab 57 may engage the rack spur 58.

The usual manual line-space lever and handle 61 is pivoted at 62 to the carriage frame 26 and serves in well-known manner for operating the line-space mechanism and returning the carriage manually.

The supporting structure 49 of the line space mechanism on the carriage includes a bracket 63 attached to the carriage frame 26 by screws 64, Figure 15. One of the rack supporting tongues 44 may be incorporated in said bracket 63 to support rack 33 at one end while the rack is supported at its other end by a similar tongue incorporated in a suitable bracket, not shown, attached to carriage frame 26. The lower end of rock shaft 48 is journaled in bracket 63 which may also include a journaling stud 65 for pinion 50. The upper end of shaft 48 may be journaled in a block 66 attached to bracket 63 by screws 67. Rack 53 is slidably retained by said block 66 and an overlying plate 68 removably secured to block 66 by screws 69.

A spring 70 is connected between the carriage side plate 24 and the line-space-pawl-bar 54 and serves to return the latter forwardly following a rearward line spacing stroke of said bar 54. The spring-return of bar 54 also serves to return the carriage-return rack 33 relatively to the carriage frame 26 if line-spacing has been effected by means of said rack 33. The carriage return mechanism is along the lines of that shown in H. L. Pitman Patent No. 2,054,095, issued September 15, 1936 to which reference may be had for further details.

Figures 5, 6, 7, 8, 9:
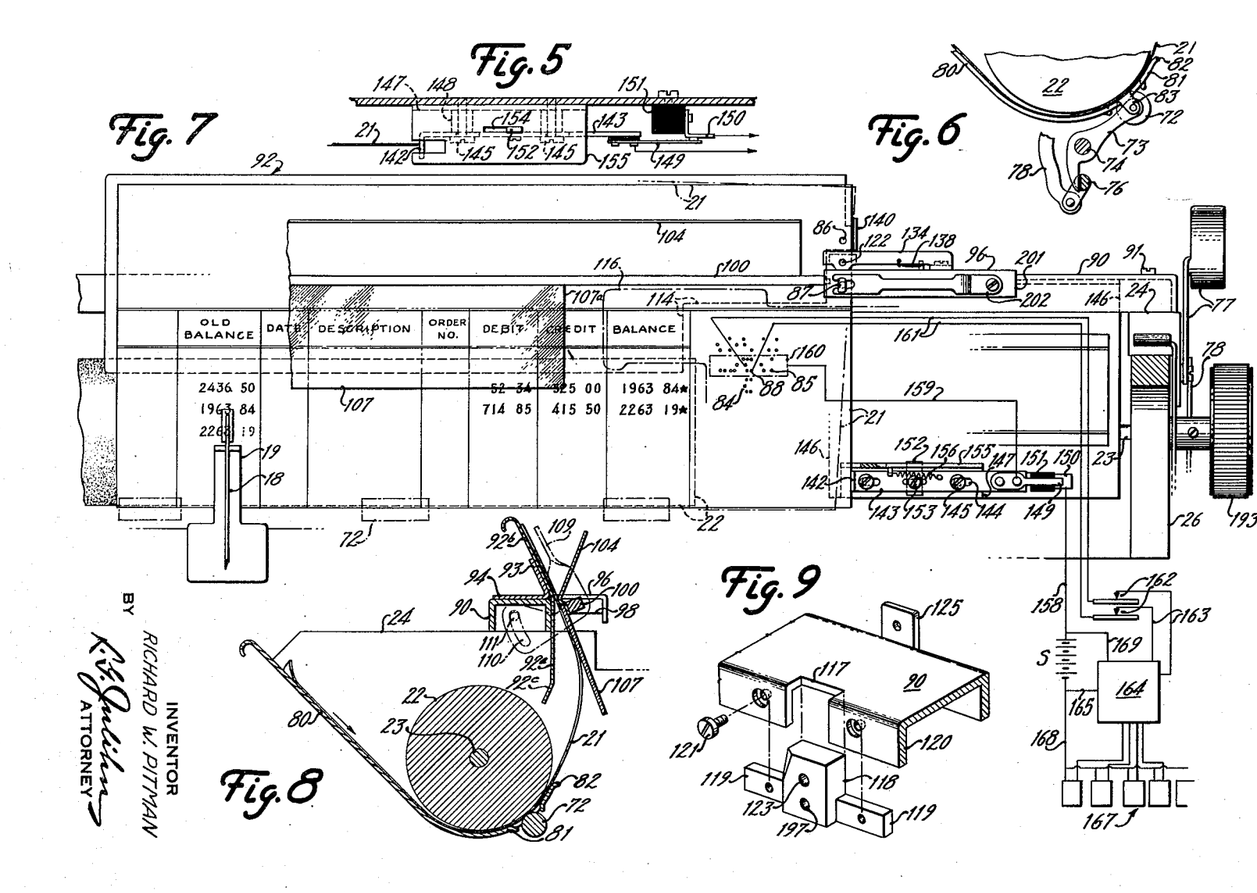
Figure 5 is a top plan view of a sheet edge stop device including a switch for controlling an operating circuit of the machine.
Figure 6 is a side view, partly sectioned, of a feed roll and apron device associated with the platen.
Figure 7 is a front view of the carriage and its front-insertion and locating means for the work sheet and shows the latter in place.
Figure 8 is a cross sectional side view of the carriage showing the sheet insertion throat conditioned to direct the leading edge of a rear-inserted sheet.
Figure 9 is a perspective of details of a mounting for the sheet locating pin.

Feed rolls 72 cooperate with platen 22 to feed the work sheet. Feed-roll-supporting levers 73, Figure 6, are fulcrumed on a transverse rod 74 of the platen frame and are spring-pressed to press the feed rolls toward the platen. A transverse cam-shaft 76 in the platen frame is rockable in opposite directions to effect corresponding movements of levers 73 to disengage or reengage said feed rolls from or with the platen. A feed-roll-release lever 77 is fulcrumed at the right side of the platen frame and is connected by a link 78, partly shown in Figure 6, to cam shaft 76 for operating the latter for releasing or reengaging the feed rolls.

An inclined rear paper table 80 includes a curved platen apron 81 having a front lip 82 below the printing line. Ears 83 of the apron are connected to feed roll levers 73, and the paper table is slidable on the platen frame in the direction of its slope so that the apron follows the movements of the feed rolls toward or from the platen. Therefore, when the feed rolls are moved to cast-off position, the apron lip 82 is also moved farther from the platen as indicated by the dot-and-dash line in Figure 1 to facilitate front insertion of a work sheet. The feed roll and paper table mechanism may be substantially as shown in Helmond Patent No. 1,994,647, dated March 19, 1935.

In Figure 7, 21 designates a ledger sheet on which lines of entry are usually made one at a time in that the sheet is usually removed from the machine after a one-line entry has been made thereon and other sheets are successively inserted and replaced in the machine for receiving entries. Each entry includes an "old balance" amount and a "debit" or "credit" amount computed against the old balance to give a new balance amount which is typed in the "balance" column and is recorded codally by letter-spaced perforations 85 made in the last column by means of suitable mechanism, not shown in detail herein but which may be provided in the machine and includes a group of punches 84. In the present instance, the line of perforations 85 is shown off-set above the typing line of a corresponding entry.

For each last line of entry made on the sheet, the latter is marked with an index preferably in the form of a single hole 86 placed near the right-hand edge of the sheet. A punch 87 is operable to punch the hole 86 and its location is preferably fixed in the machine relatively to sheet gaging devices so that each hole punched has a fixed location on the sheet with reference to the corresponding line of entry.

In the present instance, each line of entry on the sheet is made at a distance of two line space units below the preceding line of entry. Correspondingly, when a sheet is replaced in the machine for making a new entry, it is positioned by placing the hole 86 for the last prior entry two line space units of distance above the location of the punch 87.

When a sheet is positioned in the machine by means of its last-made hole 86, the codal perforations 85 corresponding to the last-made previous line of entry will be in position to traverse and be sensed by means of a group of sensing pins 88 relatively to which the carriage and ledger sheet 21 are movable laterally during the sensing operation. There is a group of five punches 84 and at a distance of two letter spaces above this group there is a group of five sensing pins 88. These groups are represented in Figure 7 by the solidly inked circles in distinction from the codal perforations 85.

The carriage is initially positioned for the "old balance" column so that said pins 88 sense those perforations that correspond to the highest order digit represented by the last-made line of perforations 85 on the sheet. In response to the sensing of the highest order digit, a type bar selecting and actuating circuit, including electromagnet mechanism, is controlled to cause the digit to be printed automatically by means of the appropriate numeral type bar 18. The resulting letter-feed step of the carriage and work sheet brings the perforations 85, representing the next higher digit, into sensing position relatively to the group of pins 88 so that said next higher perforations are sensed and thereby operation of a corresponding numeral type bar 18 is effected. And so the sensing and automatic typing proceed digit by digit until the last digit represented by the perforated balance is sensed and is typed in the old balance column. Then the carriage is advanced for typing the entries in the debit and credit columns of the work sheet, and then is further advanced for typing the new balance and recording same by making corresponding perforations 85 by means of the punching mechanism which includes the group of punches 84. The corresponding new sheet locating hole 86 is, of course, made by operating the punch device 87 before the sheet is removed from the machine.

The present invention is concerned principally with sheet positioning mechanism which will now be described.

A transverse bar 90, preferably of channel cross section, is secured by screws 91 to side plates 24 of the platen frame. A transverse plate 92, preferably of sheet metal, is of suitable length according to the width of work sheet 21 and is attached as by rivets or welding to a cleat 93 having a horizontal flange 94 secured to the top of bar 90 by screws 95. Plate 92 is of angular form to present a lower wall face 92$^a$ in a plane substantially tangent to the front of platen 22, and an upper face 92$^b$ flaring upwardly and rearwardly. The lower margin of the lower face 92$^a$ may flare toward the platen as at 92$^c$. A plate 96 fastened by screws 97 upon bar 90 includes a block 98 drilled for a pintle 99 at one end of a transverse square axle bar 100 having also an opposite pintle 101 journaled in an ear 102 bent downwardly from a plate secured by screw 91 upon bar 90. A forwardly and upwardly flaring plate 104 has a lower margin 105 secured by screws 106, Figure 2, to the back of bar 100 together with the upper margin of a plate 107 which is preferably of transparent plastic material. Plate 107 faces and is normally close to the lower work-sheet-backing face 92$^a$ to form with the latter a sheet-inserting throat or passage that is substantially tangent to the platen and for which there is a flaring entrance formed by plate 104 and the upper back plate portion 92$^b$. A finger piece 109, fixed to pintle 101, is manipulatable for turning bar 100 and its plates 104, 107 to the Figure 8 position so that the throat flares at the bottom in order to facilitate introduction of a rear-inserted sheet through the throat. An extension of finger piece 109 has a slot 110 whose ends may stop on a pin 111 in ear 102 to limit the rotation of bar 100 and its plates 104, 107. A spring 112 surrounds pintle 101 and is compressed between ear 102 and the pintle shoulder to urge bar 100 rightwardly of Figure 14 to keep a detent spot 113 which is embossed on the inner side of finger piece 109 in one or another detent recess in ear 102, whereby bar 100 and its plates 104, 107 are yieldably detented in either position.

In the present instance, the lower portion 92$^a$ of the sheet backing plate 92 has a jog 114, Figure 7, to clear a head which includes the punching and sensing mechanism for the perforations 85. The transparent front plate 107 ends at 107$^a$ to clear a front plate 116 of the punching and sensing head. Plate 116 and a rear plate such as 160, Figure 7, of said head are slightly separated facewise and are disposed on the carriage so that the work sheet 21 is introduced between them at the introduction of said work sheet between plates 92, 107. The punching and sensing head, with its plate structure 116, 160, is mounted on and movable with the carriage, but is arrestable so as to be stationary during punching and sensing, substantially as set forth in my copending application Serial No. 102,389, filed September 24, 1936, which matured as Patent No. 2,278,-118 March 31, 1942. While the sheet backing plate 92 has the aforesaid jog 114 to clear a backing plate, such as 160, of the head, the front plate 104, 107 also has a jog defined by the rightward extension of the upper margin of said front plate beyond the end 107ª of its lower portion 107, as will be seen at Figure 7. The throat thus extends over the head to facilitate introduction of the work sheet between plates 116, 160 of the head.

Bar 90 has a recess 117, Figure 9, for a block 118 provided with lateral lugs 119 seatable against the back of the front wall 120 of channel bar 90. Said wall 120 and lugs 119 are drilled and tapped to receive fastening screws 121 whereby block 118 is attached to bar 90 and projects above the latter. A pin 122, Figures 3, 4 and 10, adapted to engage in the sheet locating hole 86 of the work sheet 21 has a sliding bearing in a hole 123 of block 118. A reduced stem 124 of pin 122 has a sliding bearing in a plate 125 fixed by screws 126 to the back of bar 90. A spring 127 around stem 124 keeps pin 122 projecting normally from block 118 as in Figures 4 and 11. A block-like arm 128 has a hole and is slitted above the hole for securing it to stem 124 by a screw 129. A corner of the block-like arm 128 is formed with a cam bevel 130 which normally abuts a camming stud 131 on plate 125 and thereby limits the extent to which pin 122 normally projects from block 118 under the urge of spring 127. A sleeve 132 may loosely surround pin 122 to cover spring 127. By rocking arm 128 in the direction of the arrow, Figure 3, its cam bevel 130 overrides the end of stud 131 and thereby the pin 122 is rotated and moved longitudinally to retract its end from the sheet locating hole 86 and into block 118 whereby to release the work sheet at operation of the line spacer as will appear presently.

A sheet holding finger 134 is pivoted, at an ear 135 thereof, on a headed shoulder stud 136 on plate 96. Said finger is provided with a boss 137 that faces block 118 and is drilled to fit around the sheet locating pin 122. A spring 138 connected between plate 96 and finger 134 forces the latter and its boss 137 toward block 96 so that the boss 137 may press upon the work sheet around the sheet locating pin 122 and thereby yieldably keep the sheet in place upon said pin which, therefore, may project only slightly through said work sheet. Preparatory to withdrawing the work sheet from the machine, it may be stripped off pin 122 by manually drawing the sheet at its upper right-hand corner forwardly as indicated by the dot-and-dash lines in Figure 3; finger spring 138 yields to permit finger 134 to be drawn, with the work sheet, away from the pin. The work sheet, when thus stripped off pin 122, may be drawn upwardly out of the machine. Finger 134 has a forwardly flaring lateral extension 139 to facilitate the introduction of the work sheet to the machine. For such introduction, the right-hand margin of the work sheet is placed behind extension 139 and partly down into the above-described throat. Then by drawing the corner of the sheet above the finger 134 forwardly, the finger is swung forward enough to permit the right margin of the work sheet to pass behind boss 137, suitably beveled as at 133, Figure 11, and in front of pin 122 and stop laterally against a gaging ear 140 provided on plate 92. The sheet is pushed downwardly into the machine until its lowermost sheet locating hole 86 finds the locating pin 122, which condition may be readily sensed by the operator in that it will be felt that the edge of the hole 86 strikes the upper side of the projecting pin 122, and spring-pressed finger 134 presses the sheet home over the projecting pin 122 and against the front face of block 118.

Before a work sheet 21 is inserted in the machine and placed over pin 122, the feed rolls 72, and apron 81, may be cast off, by depressing release lever 77, to facilitate the front insertion and squaring of the sheet. When the front insertion of the work sheet is stopped by means of the last-made hole 86 and pin 122, it is rotatable about said pin 122, as is indicated by the dot-and-dash and full-line showing of the sheet in Figure 7, to place finally its right-side edge against a stop 142 in order to place the work sheet squarely in the machine. The feed rolls 72, and apron 81, are now restored by restoring lever 77 to clamp the sheet, by means of the feed rolls, in its properly placed and squared position against platen 22. The gaging ear 140 may be slightly to the right of the normal position of the edge of the sheet 21 in order to facilitate turning of the sheet about pin 122.

Stop 142 projects forwardly from a bar 143, Figures 5 and 7, having slots 144 by which it is slidably mounted for lateral movement on shoulder screws 145 threaded into a plate 146; said bar 143 is spaced by an intermediate plate 147 and spacers 148 from plate 146 which depends from and is suitably fixed to the underside of transverse bar 98. A contact finger 149 of spring metal is secured to, but electrically insulated from bar 143. An angle piece forming a contact 150 is attached to an insulator 151 secured to plate 146. A tongue 152 has a screw-and-slot connection 153 to bar 143 and stops against the right-hand end of a slot 154 in a horizontal shelf 155 of plate 147 to determine the work sheet gaging position of stop 142. Said screw-and-slot connection 153 permits stop 142 to be set accurately laterally relatively to said end of slot 154. A spring 156, connected between shelf 155 and bar 143 may move the latter leftwardly from the Figure 5 position to separate contacts 149, 150, to break an operating circuit, if a work sheet is not in proper place, or is absent entirely from the machine.

Said operating circuit is diagrammed at Figure 7 and may be described briefly as follows: One side of a current supply S is connected, through a lead 158, closed switch 149, 150, and a lead 159 to a contact plate 160 disposed behind the work sheet 21. Each sensing element 88 may establish electrical contact of a lead 161 with said plate 160 through a corresponding one of the codal perforations 85 in the work sheet. A flexible or sliding contact connection 162 is associated with each lead 161 and enables the carriage, while traversing a sensing zone, to connect said lead 161 to a lead 163 running to a corresponding relay magnet, not shown, in a box 164 on the frame of the machine. From the relay magnets in box 164, there is a common return lead 165 to the other side of the current supply S. A group of numeral-type-operating magnets 167 is connected by a common lead 168 to one side of the current supply S. The other side of the current supply is connected by a lead 169 to a relay contact device, not shown, in the box 164. The relay contact device is controlled by the relay magnets to connect said other side of the current supply by way of lead 169, to one or another of the type operating magnets 167 to control operation of the latter. Excepting the switch 149, 150, the described circuit is along the lines shown in my aforesaid copending application Serial No. 102,-389 which matured as Patent No. 2,278,118 March 31, 1942. In the diagram at Figure 7, only two of the leads 161 and their connections to the relay box are shown to illustrate that two of the perforations 85 are being sensed in combination, by two of the sensing elements 88, for the instant digit. A lead 161 and connection 162 is associated with each of the other sensing elements 88. It will be apparent now that the operating circuit is partly completed at the switch 149, 150 if a work sheet is properly in place and that said circuit is fully completed by means of the sensing elements working through the perforations 85 of the work sheet. Conversely, if the contacts 149, 150 are separated, as would be the case in the absence or improper placement of a work sheet in the machine, the circuit would be broken so that even if the sensing elements 88 close their portions of the circuit, this cannot effect operation of the relay and electromagnetic devices.

Figure 7 shows an old balance of 2263.19 as being typed to begin the third line of entry in response to the sensing of the last-made line of perforations 85 on the sheet. As hereinbefore mentioned, a line of entry concludes with typing the new balance in the balance column and making corresponding perforations 85 in the last column. A new sheet-locating hole 86 will also have been punched by operating the punch 87. The carriage is then returned either manually by means of the line-space and carriage-return handle 61, or by power by causing the carriage-return pinion 34 to become clutched to the power shaft 35. In either case there will occur an operation of the line space mechanism to advance the work sheet so that it is necessary first to retract the sheet-locating pin 122, and this may be done by rotating the block-like arm 128 in the direction of the arrow, Figure 3. For rotating said arm 128 automatically at a line-spacing operation, the following structure may be provided.

The lower part of arm 128 is reduced in thickness as will be seen in Figures 3 and 4 and has a slot 170 to straddle a pin 171 in a transverse link 172. Headed shoulder studs 173 projecting from the rear side of supporting bar 90 are received in slots 174 in link 172 to support the latter slidably for opposite endwise movements. The line-space pawl-carrying bar 54 has an ear 175 to which there is attached, by a headed shoulder stud 176, a bar 177 having a slot 178 at which the rear end of said bar slidably fits a headed stud 179 in the left-hand plate 24 of the platen frame. A spacer 180 is disposed between plate 24 and bar 177. A horizontal plate 177a of bar 177 is cut out to form a cam edge 181 adjacent and cooperative with a downwardly projecting tongue 182 provided on link 172. A spring 183 is anchored at 184 on supporting bar 90 and is attached to link 172 to urge the latter endwise toward the right of Figures 3 and 10. At the line-spacing operation an initial portion of the rearward stroke of line space pawl bar 54 is taken up before the pawl-controlling tab 59, which is set in position for two line space units, permits the pawl 55 to drive the line-space ratchet wheel 56 and platen 22 in line-spacing direction. During said initial portion of the rearward stroke of bar 54, the accompanying rearward movement of cam edge 181 forces the link 172 to move leftwardly to rock arm 128 sufficiently so that its cam bevel 130 overrides the stud 131, thereby causing said arm 128 as it rotates to shift rearwardly. Since said arm is secured to sheet-locating pin 122, the rearward shift of said arm which accompanies its described rocking movement retracts said pin sufficiently from the work sheet to permit the line-space advance of the sheet which attends the completion of the rearward stroke of bar 54. During the completion of the rearward stroke of bar 54, the cam edge 181 may continue to move link 172 and correspondingly rock the arm 128 farther. During this excess rocking of arm 128, the front flat face of the upper portion thereof may pass idly over stud 131 as a dwell and therefore need cause no further retraction of pin 122.

Upon finishing the carriage-return movement, the initiation of which follows the line-spacing operation, the line-space and carriage-return handle 61, or the carriage-return rack 33 is released thereby permitting the line-space pawl bar 54 to be restored forwardly by its spring 70. The accompanying forward restoration of the cam edge 181 permits link 172 to be restored rightwardly by its spring 183 thereby rotating arm 128 back to its normal position to permit sheet-locating pin 122 to be restored by its spring 127 to its normal position in which it slightly projects from block 118. When pin 122 becomes thus restored the work sheet will have been line spaced and may present an unperforated portion opposite said pin so that there is then no obstruction by pin 122 to pulling the work sheet out of the machine. Nor will the restoration of pin 122 tend to pierce the unperforated portion, this being avoided because of the yieldability of finger 134.

Link 172 may have an upwardly projecting finger piece 185 by which the link may be moved manually toward the left to retract pin 122 independently of a line-spacing or carriage-return operation. In such case the lower tongue 182 of link 172 moves idly within the opening of plate 177a. Link 172 is bent as at 187 merely to pass behind plate 125 while the main portion of the link is disposed adjacent the back of supporting bar 90.

Figures 10, 11, 12:
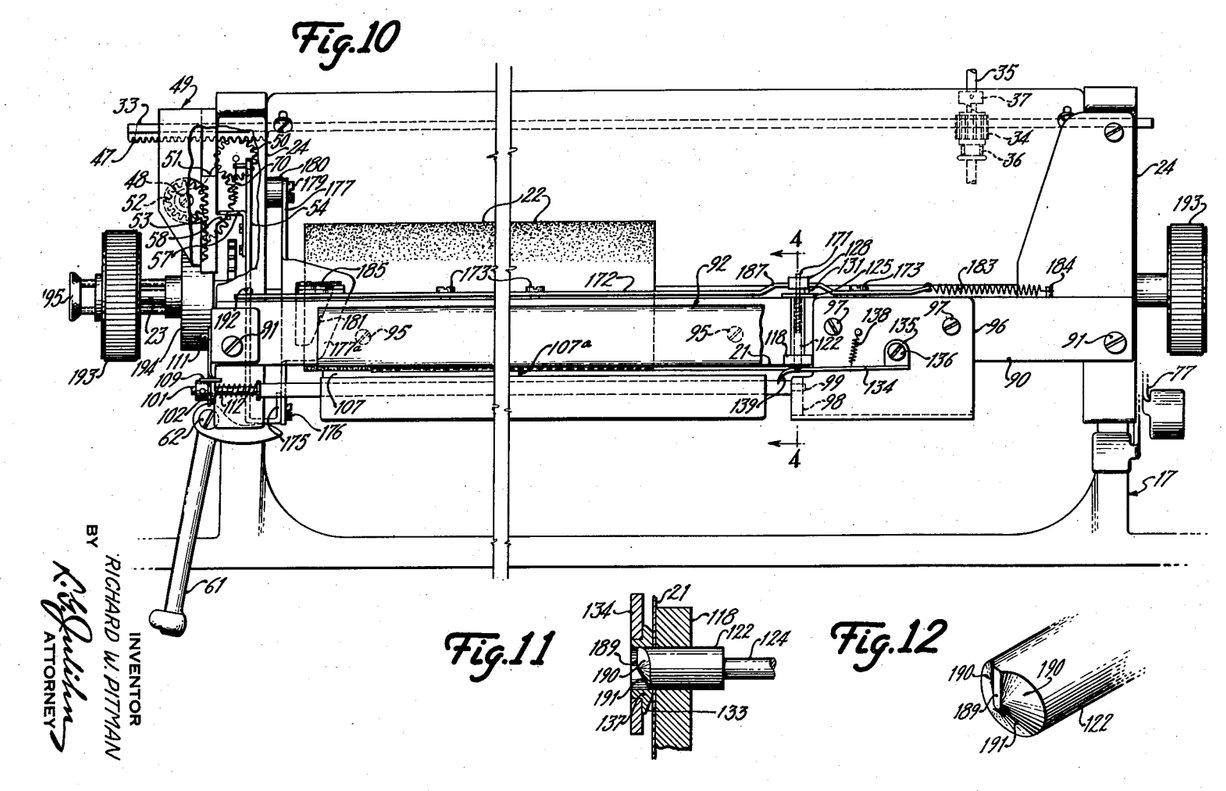
Figure 10 is a top plan view of the carriage showing parts of the sheet locating means in their normal positions.
Figure 11 is a large scale cross-sectional view showing details of the sheet locating pin and adjacent parts.
Figure 12 is a perspective showing details of the sheet-entering end of the locating pin.

The front end of the sheet locating pin 122, Figures 11, 12, is shaped to leave a leading end of reduced area preferably in the form of a facet 189, and to recede bevelwise from the sides of the reduced end or facet as at 190 and from the bottom of the end or facet as at 191. The reduction of the front end of pin 122 and the bevel thus provided conduces to guide the edge of the last-made hole 86 of the work sheet onto the pin when the sheet is inserted downwardly into the machine. The bevel, particularly the lower portion 191 thereof, also facilitates stripping the sheet off the pin. That is to say, while the sheet is being pulled forwardly by the typist's hand to strip it off the pin, it may, at the same time be urged upwardly by a slight pull on the sheet so that the lower edge of the sheet locating hole 86 may react against the bevel 191 and this conduces to camming or guiding the sheet off the pin.

In Figure 10, 192 represents a pin in the left-hand side plate 24 to support the left end of link 172 against rearward thrust induced by the action of the cam 181.

Platen axle 23 has the usual finger knobs 193. A conventional platen release clutch is enclosed in a casing 194 and is operable by means of a finger knob 195 to disconnect platen 22 from the spring-detented ratchet wheel 56 for permitting the platen to be rotated independently to bring the first entry line of a ledger sheet to the printing line. A spring-pressed detent 196 is associated with wheel 56. A platen release clutch is exemplified in W. F. Helmond Patent No. 1,432,695, dated October 17, 1922.

Following the making of an entry, the work sheet 21 may be pulled out of the machine after the carriage has been fully returned and the feed roll release lever 77 has been depressed to cast off the feed rolls 72 to release the sheet. The operator may also depress the release lever 77, and effect the withdrawal of the work sheet from the machine at least in part during the power-driven return movement of the carriage thereby saving time as contrasted with waiting until the end of the carriage return to withdraw the sheet. The operator may depress the release lever 77 with the heel of the right hand and at the same time grasp the upper right-hand corner of the sheet with the fingers to strip it off pin 122 and withdraw it from the machine. The feed rolls may be restored by restoring the release lever 77 when a succeeding sheet has been placed in the machine.

Block 118 includes a die hole 197 for the locating-hole punch 87. A guide and stripper bar 198 for punch 87 is fixed to the wall 120 of bar 90 together with a spacer 199 which provides for a work-sheet-receiving gap 200 between block 118 and bar 198. The front end of punch 87 is slidably supported in a flange 201 of plate 96 to which there is also fixed a retractor spring 202 articulated to punch 87.

It will be observed that the punch, sensing and sheet locating devices are disposed, as represented in Figures 7 and 14, to the right of the right-hand end of the platen 22 and between said platen end and the right-hand side of carriage frame 26. The inserted work sheet 21 accordingly extends laterally beyond the right platen end to the stop 142. Said stop 142 is preferably disposed, Figure 1, below the printing line and, therefore, may engage the sheet edge at the portion of the sheet which follows the curve of the platen. Therefore, stop 142 is spaced sufficiently distant from pin 122 to afford gaging points sufficiently separated in the direction of the sheet edge for facilitating squaring the sheet properly in the machine.

It has been stated above that usually the sheet is removed from the machine after making a single line of entry thereon. However, several lines may be entered upon the sheet before removing it; but a sheet-locating hole 86 is made on the sheet at least for the last line of entry so that if the sheet is thereafter removed, it may be relocated by means of pin 122 for the next entry made when the sheet is reinserted. When several lines of entry are made upon a sheet following insertion thereof in the machine, the line space mechanism of course is operated to line-space the entries and it will be obvious that the described operative connection of the line-space mechanism to the sheet-locating pin 122 serves to retract the latter to permit line spacing of the several entries made before the sheet is withdrawn. It may be that the sheet is not punched at 86 for an intermediate line of entry; in this event the sheet locating pin 122 may merely bear idly against the back of the sheet when the latter is positioned for the intermediate line of entry.

Variations may be resorted to within the scope of the invention and portions of the improvements may be used without others.

What is claimed is:

1. In a typing machine, the combination of a revoluble platen, a part operable in a working stroke of which a latter portion effects rotation of the platen and attendant advance of a work sheet on the platen, an initial portion of said stroke being idle a sheet locating stop, engaging and locating the sheet upon its insertion and normally opposing advance of the sheet, and means coacting with said part in its said initial idle portion of stroke to disengage said sheet and stop to permit advance of said sheet consonantly with the latter portion of said stroke.

2. In a typing machine the combination of a reciprocatory carriage in which a work sheet is insertable, a sheet locating stop on said carriage effective upon insertion of the sheet to engage a suitable edge of the sheet and normally opposing withdrawal of the inserted sheet, means operable for imparting an extensive movement to the carriage, and means operatively connected to said carriage moving means so that an operation of said carriage moving means disengages said sheet and stop to permit withdrawal of the sheet during the carriage movement.

3. In a typing machine, the combination of a reciprocatory carriage in which a work sheet is insertable, a sheet locating stop engaging said sheet upon its insertion and normally opposing withdrawal of the inserted sheet, a member on the carriage engageable to impart extensive movement to the carriage, said member, upon its engagement, being initially and limitedly moved relatively to the carriage before the carriage movement is imparted, and means coacting with said member during its said initial movement to disengage said stop and work sheet to permit withdrawal of said sheet during the subsequent carriage movement.

4. In a typing machine, a support, a work-sheet locating pin, a device effective upon rotating the pin about its longitudinal axis in said support to retract the pin from the work-sheet, a line space mechanism and an operating connection to said pin from said line space mechanism so that operation of said line space mechanism rotates and therefore retracts said pin.

5. In a typing machine, a support, a work-sheet locating pin, a device effective upon rotating the pin about its longitudinal axis in said support to retract the pin from the work sheet, a link connected to said pin and movable endwise to rotate and thereby retract the pin, and a cam movable transversely of and engaging the link to move it endwise.

6. In a typing machine, a support, a work-sheet locating pin, a device effective upon rotating the pin about its longitudinal axis in said support to retract the pin from the work-sheet, a link connected to said pin and movable endwise to rotate and thereby retract the pin, and a cam movable transversely of and engaging the link to move it endwise, said link having a finger piece and being movable endwise independently of said cam by means of said finger piece.

7. In a machine of the class described; a work sheet locating device, comprising, a support, a sheet-locating pin rotatably and longitudinally movable in said support, means operable to rotate said pin, and means effective, depending upon the rotation of said pin, to translate said rotation into longitudinal pin movement to project or retract said pin to or from the work sheet.

8. In a machine of the class described; a work sheet locating device, comprising, a support, a sheet-locating pin rotatably and longitudinally movable in said support, means operable to rotate said pin, and cam-and-spring means effective depending on the rotation and direction of rotation of said pin to translate said rotation into longitudinal pin movement to project or retract said pin to or from a work sheet.

9. In a machine of the character described having a platen, a platen support and recording mechanism; work-sheet positioning means comprising a single pin on said support adapted to fit a locating hole or the like at one of the side edges of the sheet, and a stop on the platen support spaced from said pin in a direction following said edge and adapted to abut the paper, said pin and stop constituting the sole elements for positioning said sheet squarely to receive a record imprint from said recording mechanism.

10. In a machine of the character described having a platen, a platen support and recording mechanism; work-sheet positioning means comprising a single pin on said support adapted to fit a locating hole or the like at one of the side edges of the sheet, a stop on the platen support spaced from said pin to engage said one edge, an abutment on the platen support against which said stop is pressed when there is a squarely positioned sheet in the machine, and away from which the stop tends to move when there is not a squarely positioned sheet in the machine, said machine including an operating mechanism, and means responsive to the movement of the stop away from the abutment to suppress said operating mechanism.

11. In a machine of the character described having a platen, a platen support and recording mechanism; work-sheet positioning means comprising a single pin on said support adapted to fit a locating hole or the like at one of the side edges of the sheet, a stop on the platen support spaced from said pin to engage said one edge, an abutment on the platen support against which said stop is pressed when there is a squarely positioned sheet in the machine, and away from which the stop tends to move when there is not a squarely positioned sheet in the machine, said machine including an electric operating circuit, and means responsive to movement of the stop away from the abutment to disable said circuit.

12. A cylindrical sheet-locating pin having an end face formed by a substantially quadrilaterally-edged facet, and by face portions receding bevel-wise from three edges of the facet, the fourth edge of the facet coinciding with the periphery of the pin.

13. A machine of the character described, having in combination a front-strike revoluble platen, a platen frame, a sensing head or the like on and toward one side of said frame, including plate like structure extending beyond one end of the platen to overlap a marginal portion of the work sheet on the platen and extending laterally beyond said platen and above the printing line, and front and rear plates supported on said frame to constitute therebetween a front insertion throat extending laterally, along the platen, from said plate like structure of the head toward the other platen end and serving to introduce the sheet both to said structure and platen.

14. A machine of the character described, having in combination a front-strike revoluble platen, a platen frame, a sensing head or the like on and toward one side of said frame, including plate like structure extending beyond one end of the platen to overlap a marginal portion of the work sheet on the platen extending laterally beyond said platen and above the printing line, and front and rear plates supported on said frame to constitute therebetween a front insertion throat extending laterally, along the platen, from said plate like structure of the head toward the other platen end and serving to introduce the sheet both to said structure and platen, said throat plates being jogged at one lower corner portion so that upper margins thereof above the jog are disposed as a throat portion over said plate structure.

15. A machine of the character described, having in combination a front-strike revoluble platen, a platen frame, a sensing head or the like on and toward one side of said frame, including plate like structure extending beyond one end of the platen to overlap a marginal portion of the work sheet on the platen extending laterally beyond said platen and above the printing line, and front and rear plates supported on said frame to constitute therebetween a front insertion throat extending laterally, along the platen, from said plate like structure of the head toward the other platen end and serving to introduce the sheet both to said structure and platen, said throat plates being jogged at one lower corner portion so that upper margins thereof above the jog are disposed as a throat portion over said plate structure, and a sheet locating-pin-device disposed on the platen frame at a level between said plate structure of the head and throat portion to cooperate with a pin-engaging side portion of the sheet.

16. In a front strike typing machine having a revolvable platen and a support therefor; front and rear structures mounted on said support and affording opposite face portions which form a front sheet-insertion throat along the platen, a sheet-locating pin mounted to project across said throat from the rear structure to the front structure, the front structure being in two parts, one of said parts being opposite said pin and being movably mounted relatively to the other of said parts so as to be retractable from the pin to facilitate the placing and withdrawal of a locating hole, in a sheet introduced into the throat, over and from said pin.

RICHARD W. PITMAN.